United States Patent
Sato

(10) Patent No.: US 11,293,836 B2
(45) Date of Patent: Apr. 5, 2022

(54) EQUIPMENT INSPECTION SYSTEM, EQUIPMENT INSPECTION METHOD, AND PROGRAM

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 78 days.

(21) Appl. No.: 16/680,735

(22) Filed: Nov. 12, 2019

(65) Prior Publication Data

US 2020/0217751 A1    Jul. 9, 2020

(30) Foreign Application Priority Data

Jan. 7, 2019   (JP) .............................. JP2019-000747

(51) Int. Cl.
    *G01M 13/00*       (2019.01)
(52) U.S. Cl.
    CPC .................................. *G01M 13/00* (2013.01)
(58) Field of Classification Search
    CPC .............................. G01M 13/00; G06Q 10/20
    See application file for complete search history.

(56) References Cited

U.S. PATENT DOCUMENTS

2014/0278711 A1*   9/2014   Fuller .............. G06Q 10/06315
                                                                  705/7.25
2016/0292652 A1*   10/2016   Bowden, Jr. .......... G06Q 10/20

FOREIGN PATENT DOCUMENTS

| JP | 4940180 B2 * | 5/2012 |
| JP | 4940180 B2 | 5/2012 |
| JP | 5388713 B2 | 1/2014 |
| JP | 2016-224862 A | 12/2016 |

* cited by examiner

*Primary Examiner* — Manuel L Barbee
(74) *Attorney, Agent, or Firm* — Oblon, McClelland, Maier & Neustadt, L.L.P.

(57) ABSTRACT

An equipment inspection system capable of creating an inspection plan for inspecting a component part of an equipment at an appropriate timing is provided. An equipment inspection system includes an index acquisition unit, an importance level judgement unit, and an inspection time determination unit. The index acquisition unit acquires at least one influence index. The importance level judgement unit judges an importance level of an inspection on a component part based on the influence index. The inspection time determination unit determines the inspection time of the component part according to the importance level.

4 Claims, 10 Drawing Sheets

FAILURE HISTORY

| FAILURE DATE | STOPPED PERIOD | IDENTIFICATION INFORMATION |
|---|---|---|
| ⋮ | ⋮ | ⋮ |
| t1 | T1 | COMPONENT PART X1 (EQUIPMENT #1、COMPONENT PART X) |
| t2 | T2 | COMPONENT PART Y1 (EQUIPMENT #1、COMPONENT PART Y) |
| t3 | T3 | COMPONENT PART X2 (EQUIPMENT #2、COMPONENT PART X) |
| t4 | T4 | COMPONENT PART Y2 (EQUIPMENT #2、COMPONENT PART Y) |
| ⋮ | ⋮ | ⋮ |
| t5 | T5 | COMPONENT PART X1 (EQUIPMENT #1、COMPONENT PART X) |
| t6 | T6 | COMPONENT PART Y1 (EQUIPMENT #1、COMPONENT PART Y) |
| t7 | T7 | COMPONENT PART X2 (EQUIPMENT #2、COMPONENT PART X) |
| t8 | T8 | COMPONENT PART Y2 (EQUIPMENT #2、COMPONENT PART Y) |
| ⋮ | ⋮ | ⋮ |

Fig. 4

EQUIPMENT INSPECTION SYSTEM, EQUIPMENT INSPECTION METHOD, AND PROGRAM

CROSS REFERENCE TO RELATED APPLICATIONS

This application is based upon and claims the benefit of priority from Japanese patent application No. 2019-000747, filed on Jan. 7, 2019, the disclosure of which is incorporated herein in its entirety by reference.

BACKGROUND

The present disclosure relates to an equipment inspection system, an equipment inspection method, and a program. In particular, the present disclosure relates to an equipment inspection system, an equipment inspection method, and a program related to an equipment inspection.

Using an equipment such as industrial robots, predetermined operations such as welding and painting are performed in a plant for manufacturing, for example, car bodies. The equipment performs predetermined operations using component parts such as a motor, a brake, and a speed reducer. In such an equipment, maintenance work (conservation or inspection work) for the equipment is performed in order to prevent the equipment from unintentionally stopping during the operations.

In regard to the above technique, Japanese Unexamined Patent Application Publication No. 2016-224862 discloses a maintenance work interval determination apparatus that can determine a maintenance work interval which enables prevention of a deterioration of maintenance quality when an actual failure occurrence time varies. The maintenance work interval determination apparatus according to Japanese Unexamined Patent Application Publication No. 2016-224862 judges, in regard to a failure distribution, which is a statistical distribution with which the failure occurrence rate in the facility is assumed to be in accordance, whether a difference between the number of assumed failures and the number of actual failures satisfies a preset number matching condition. The maintenance work interval determination apparatus according to Japanese Unexamined Patent Application Publication No. 2016-224862 determines a maintenance work interval in the facility based on the failure distribution judged to satisfy the preset number matching condition.

SUMMARY

The magnitude of the influence exerted by a failure in a component part on the operation of the facility may differ depending on the component parts (parts, etc.) of the facility. For example, a certain component part may take a long time until the equipment is recovered once it has failed. For such a component part, the above-mentioned magnitude of the influence is large. On the other hand, another component part may not take much time until the equipment is recovered even if it has failed or the inspection work may not be needed by a regular replacement time. The above-mentioned magnitude of the influence exerted by a failure in such a component part is small. When the magnitude of the influence exerted by a failure in a component part on the operation of the facility is large, an importance level of an inspection on the component part becomes high. On the other hand, when the magnitude of the influence that a failure in the component part has on the operation of the facility is small, an importance level of an inspection becomes low.

However, the above-mentioned Japanese Unexamined Patent Application Publication No. 2016-224862 does not consider the importance level of an inspection for each component part constituting the facility. For this reason, there is a possibility that inspections of the component parts of the facility may not be performed at appropriate timings.

The present disclosure provides an equipment inspection system, an equipment inspection method, and a program capable of creating an inspection plan for inspecting a component part of an equipment at an appropriate timing.

An equipment inspection system according to the present disclosure includes: an index acquisition unit configured to acquire at least one influence index indicating a degree of an influence exerted by a failure in a component part of an equipment on an operation of the equipment; an importance level judgement unit configured to judge an importance level of an inspection on the component part based on the influence index; and an inspection time determination unit configured to determine an inspection time of the component part according to the importance level.

A method of inspecting an equipment according to the present disclosure includes: acquiring at least one influence index indicating a degree of an influence exerted by a failure in a component part of an equipment on an operation of the equipment; judging an importance level of an inspection on the component part based on the influence index; and determining an inspection time of the component part according to the importance level.

A program according to the present disclosure causes a computer to execute: acquiring at least one influence index indicating a degree of an influence exerted by a failure in a component part of an equipment on an operation of the equipment; judging an importance level of an inspection on the component part based on the influence index; and determining an inspection time of the component part according to the importance level.

As described above, in the present disclosure, an inspection plan is created in consideration of the importance level of an inspection on each component part of the equipment, which makes it possible to create the inspection plan in which an inspection is performed at an appropriate timing for each component part. That is, it is possible to create an inspection plan such that a long inspection cycle is set for a component part that only requires a long inspection cycle while a short inspection cycle is set for a component part that requires a short inspection cycle.

Preferably, every time a failure occurs in the component part, the index acquisition unit acquires the influence index, and the inspection time determination unit updates the inspection time of the component part.

With such a configuration, when the degree of the influence index is lowered by an improvement of the maintenance activity of the equipment, it is possible to prevent excessive inspections beyond the necessary frequency.

Preferably, the importance level judgement unit updates the importance level of an inspection on the component part every time a failure occurs in the component part.

With such a configuration, when the degree of the influence index is lowered by an improvement of the maintenance activity of the equipment, it is possible to prevent excessive inspections beyond the necessary frequency.

Preferably, further included is a candidate calculation unit configured to calculate an inspection time candidate based on a time predicted that the component part fails. When the importance level is lower than or equal to a predetermined rank and when a predetermined regular replacement time of the component part comes before the inspection time candidate, the inspection time determination unit excludes the component part from an inspection item.

Such a configuration effectively prevents an inspection on the component part that rarely needs to be inspected, thereby improving the efficiency of inspection work.

Preferably, the influence index includes a first index related to a time required for a recovery of the equipment including the component part when the component part fails and a second index related to an operating time of the equipment including the component part from when the component part is replaced until the component part fails next time.

The first and second indices are commonly used to manage the availability and reliability of equipments. Therefore, by using the first and second indices as the influence indices, it is possible to judge an importance level of an inspection more easily.

According to the present disclosure, it is possible to provide an equipment inspection system, an equipment inspection method, and a program capable of creating an inspection plan for inspecting a component part of an equipment at an appropriate timing.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is a diagram showing an example of a failure history according to the first embodiment;

DESCRIPTION OF EMBODIMENTS

First Embodiment

Hereinafter, embodiments of the present disclosure will be described with reference to the drawings. The following descriptions and drawings are omitted and simplified as appropriate for clarity of the descriptions. Throughout the drawings, the same components are denoted by the same reference signs and repeated descriptions will be omitted as appropriate.

Figure 1:
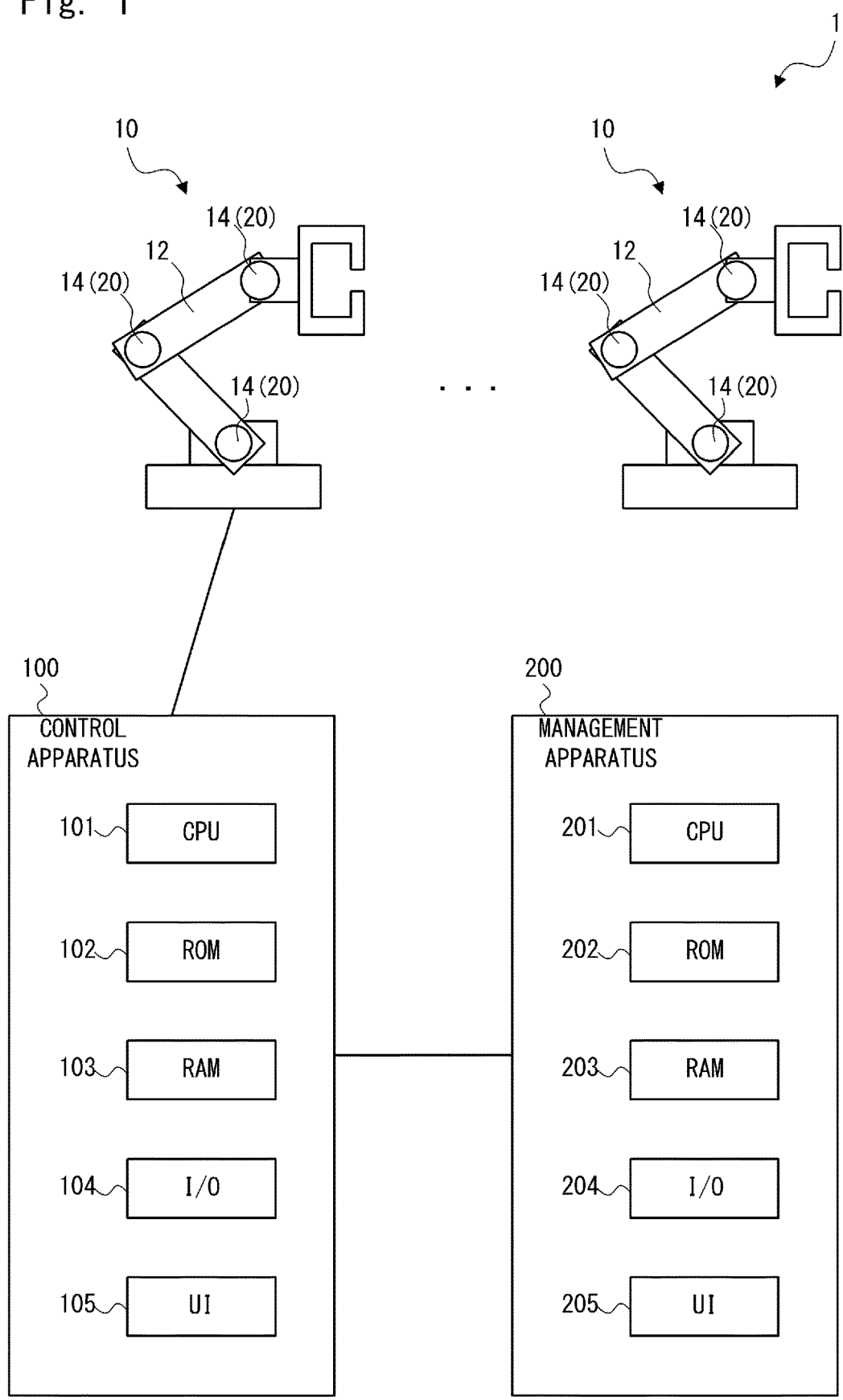
FIG. 1 is a diagram showing an equipment inspection system according to a first embodiment.
Figure 2:
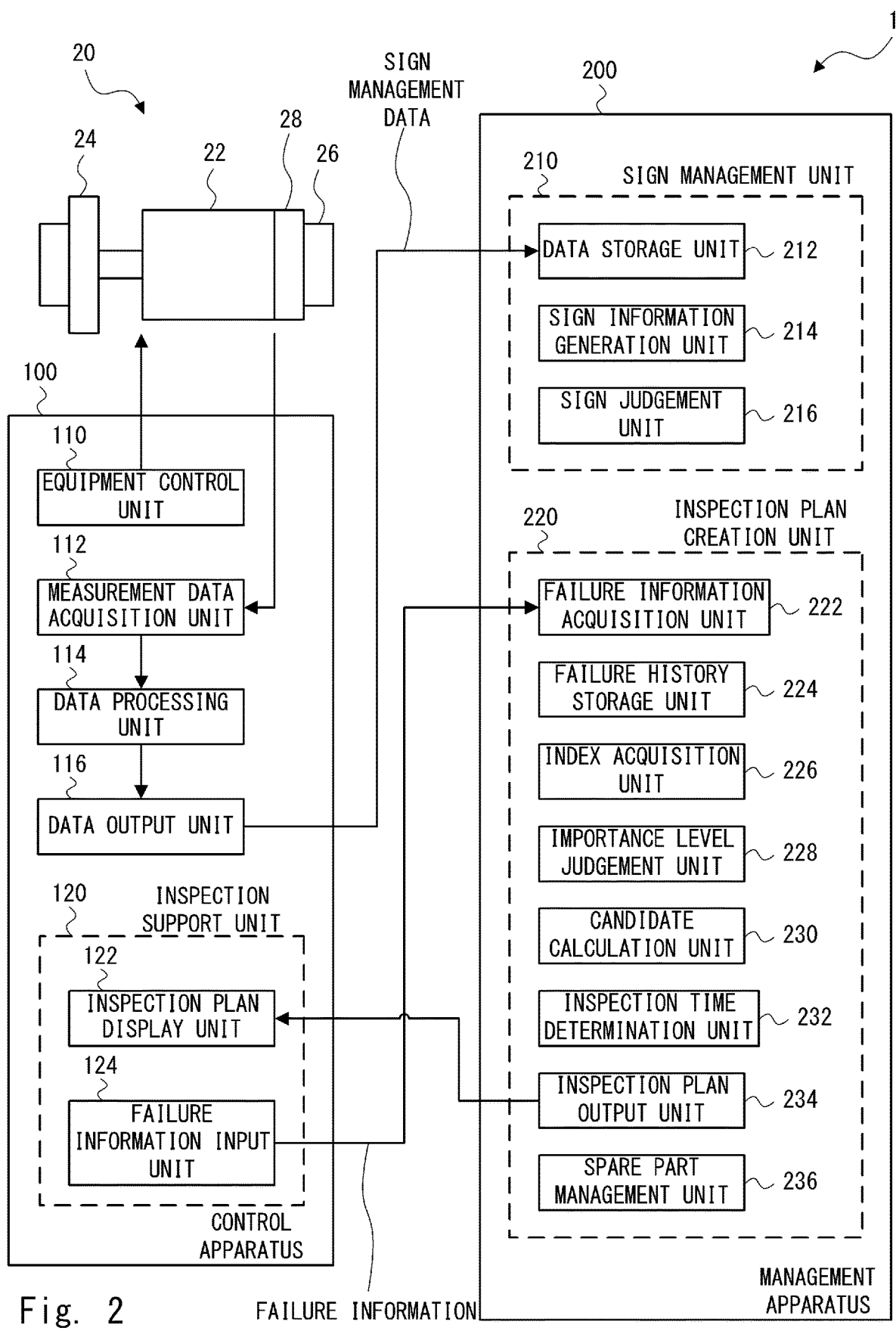
FIG. 2 is a functional block diagram showing a configuration of each apparatus of the equipment inspection system according to the first embodiment.

FIG. 1 is a diagram showing an equipment inspection system 1 according to a first embodiment. FIG. 2 is a functional block diagram of a configuration of each apparatus of the equipment inspection system 1 according to the first embodiment. The equipment inspection system 1 includes a plurality of equipments 10, a control apparatus 100, and a management apparatus 200. The equipment inspection system 1 is provided, for example, in a factory including a plurality of processing steps. As will be described later, the equipment inspection system 1 is configured to determine inspection times (inspection cycles) of component parts of the equipment 10. When the "inspection cycle" is determined, the next unique inspection time is substantially determined. Thus, determining the "inspection cycle" means determining the "inspection time".

The equipment 10 is a device such as an industrial robot. In the following embodiments, an example in which the equipment 10 is an industrial robot will be described. However, the equipment 10 is not limited to an industrial robot.

The control apparatus 100 may be provided for each of the plurality of equipments 10. At least one management apparatus 200 may be provided in the equipment inspection system 1. For example, the control apparatus 100 is connected to the equipment 10 to enable communication between them in a wire or wireless manner. In addition, the management apparatus 200 is connected to the control apparatus 100 to enable communication between them in a wire or wireless manner. The control apparatus 100 performs processing necessary for controlling the operation of the corresponding equipment 10. The management apparatus 200 performs processing necessary to create an inspection plan for each of the plurality of equipments 10. Thus, the management apparatus 200 functions as an inspection plan creation apparatus.

The equipment 10 is installed, for example, in the vicinity of a production line for vehicles. The equipment 10 is, for example, a robot for performing predetermined operations such as welding (e.g., spot welding) and painting (e.g., intermediate coating or top coating) on a vehicle. The equipment 10 includes one or more arms 12. The arm 12 includes one or more joints 14. The joint 14 includes a motor apparatus 20. The motor apparatus 20 includes a motor 22 which drives the joint 14 and a speed reducer 24 which transmits power of the motor 22 to the joint 14. The motor apparatus 20 further includes a brake 26 which brakes rotation of the motor 22. The motor apparatus 20 further includes an encoder 28 which detects a rotation angle of the motor 22. The control apparatus 100 operates the joint 14 by controlling the operations of the motor 22 and the brake 26. With such a configuration, the equipment 10 is configured to perform a desired operation. That is, the equipment 10 according to the first embodiment is a joint driving robot which operates by driving the joint 14. Further, the arm 12, the joint 14, and the motor apparatus 20 are component parts of the equipment 10. Furthermore, the motor 22, a bearing (not shown) of the motor, the speed reducer 24, the brake 26, and the encoder 28 are component parts of the equipment 10.

The control apparatus 100 includes a function as, for example, a computer. The control apparatus 100 may be mounted inside the equipment 10 or may be connected to the equipment 10 to enable communication between them in a wire or wireless manner. The control apparatus 100 may be a control panel or an operation panel installed in the vicinity of the equipment 10. In this case, the control apparatus 100 is also a component part of the equipment 10. The control apparatus 100 includes a CPU (Central Processing Unit) 101, a ROM (Read Only Memory) 102, a RAM (Random Access Memory) 103, an I/O (Input/Output) 104, and a UI (User Interface) 105 as hardware.

The CPU 101 includes a function as a processing device (processor) which performs control processing, arithmetic processing, etc. The ROM 102 includes a function as a storage for storing a control program, an arithmetic program, etc., which are executed by the CPU 101. The RAM 103 includes a function as a memory which temporarily stores processing data and so on. The I/O 104 is an input/output apparatus which inputs data and signals from the outside of the equipment 10 or the management apparatus 200 and outputs the data and signals to the outside. The UI 105 is composed of an input device such as a keyboard and an output device such as a display. The UI 105 may be configured as a touch panel in which the input device and the output device are integrated. The UI 105 may be a remote controller which is physically independent of the control apparatus 100 composed of a control panel and so on and which is connected to the CPU 101 and the like of the control apparatus 100 in a wired or wireless manner. The ROM 102 is configured to store an operation program (teaching data) for controlling the equipment 10.

The management apparatus 200 includes a function as, for example, a computer. The management apparatus 200 may be installed, for example, in a central monitoring room of a factory in which the equipment inspection system 1 is provided. The management apparatus 200 includes a CPU 201, a ROM 202, a RAM 203, an I/O 204, and a UI 205 as hardware.

The CPU 201 includes a function as a processing device (processor) which performs control processing, arithmetic processing, etc. The ROM 202 includes a function as a storage for storing a control program, an arithmetic program, etc., which are executed by the CPU 201. The RAM 203 includes a function as a memory which temporarily stores processing data and so on. The I/O 204 is an input/output apparatus which inputs data and signals from the outside of the control apparatus 100 and the like and outputs the data and signals to the outside. The UI 205 is composed of an input device such as a keyboard and an output device such as a display. The UI 105 may be configured as a touch panel in which the input device and the output device are integrated.

As shown in FIG. 2, the control apparatus 100 includes an equipment control unit 110, a measurement data acquisition unit 112, a data processing unit 114, a data output unit 116, and an inspection support unit 120. The inspection support unit 120 includes an inspection plan display unit 122 and a failure information input unit 124. The function of each constituent element of the control apparatus 100 will be described later.

Each constituent element of the control apparatus 100 shown in FIG. 2 can be implemented by the CPU 101 executing a program stored in the ROM 102. The control apparatus 100 may store a necessary program in a specified non-volatile recording medium and install the program as necessary. Note that each constituent element of the control apparatus 100 shown in FIG. 2 is not limited to being implemented by software as described above and may instead be implemented by hardware such as some circuit elements.

Further, one or more of the constituent elements of the control apparatus 100 shown in FIG. 2 may be implemented by an apparatus different from the control apparatus 100. For example, the inspection support unit 120 may be implemented by an apparatus different from the control apparatus 100 (e.g., mobile terminal such as a tablet terminal carried by a maintenance worker of the equipment 10). That is, an apparatus that controls the equipment 10 and acquires necessary data and information may be physically different from an apparatus that supports the inspection work of the equipment 10.

As shown in FIG. 2, the management apparatus 200 includes a sign management unit 210 and an inspection plan creation unit 220. The sign management unit 210 includes a data storage unit 212, a sign information generation unit 214, and a sign judgement unit 216. The inspection plan creation unit 220 includes a failure information acquisition unit 222, a failure history storage unit 224, an index acquisition unit 226, an importance level judgement unit 228, a candidate calculation unit 230, an inspection time determination unit 232, an inspection plan output unit 234, and a spare part management unit 236. The function of each constituent element of the management apparatus 200 will be described later.

Each constituent element of the management apparatus 200 shown in FIG. 2 can be implemented by the CPU 201 executing a program stored in the ROM 202. In a manner similar to the control apparatus 100, the management apparatus 200 may store a necessary program in a specified non-volatile recording medium and install the program as necessary. Note that, like the control apparatus 100, each constituent element of the management apparatus 200 shown in FIG. 2 is not limited to being implemented by software as described above and may instead be implemented by hardware such as some circuit elements. Further, one or more of the constituent elements of the management apparatus 200 shown in FIG. 2 may be implemented by another apparatus (e.g., control apparatus 100) different from the management apparatus 200.

Next, each constituent element of the control apparatus 100 shown in FIG. 2 will be described.

The equipment control unit 110 controls operations of the equipment 10. The equipment control unit 110 may control the equipment 10 in accordance with the operation program (teaching data) stored in the ROM 102. Specifically, the equipment control unit 110 controls the operation of the motor apparatus 20 of the equipment 10. That is, the equipment control unit 110 controls the motor 22 and the brake 26 of the motor apparatus 20. More specifically, the equipment control unit 110 transmits a command current indicating a command current value which is a control value (command value) to the motor 22 in order to operate the motor 22. Further, the equipment control unit 110 receives an encoder value indicating a rotation angle of the motor 22 from the encoder 28. The equipment control unit 110 may rotate the motor 22 using the rotation angle indicated by the encoder value in such a way that the joint 14 of the equipment 10 performs a predetermined operation by, for example, feedback control. Furthermore, the equipment control unit 110 transmits a brake signal (brake release signal) to the brake 26 in order to release the brake 26.

The measurement data acquisition unit 112 acquires measurement data measured by the motor apparatus 20. At this time, the measurement data acquisition unit 112 may acquire the measurement data together with identification information of the equipment 10. The measurement data is raw data indicating an operating state of the equipment 10 (motor apparatus 20). Thus, the measurement data acquisition unit 112 may include a function as an operating state acquisition unit which acquires the operating state of the equipment 10. The measurement data is, for example, the command current value, the brake signal, the encoder value, and a heating temperature. However, the measurement data is not limited to these values. For example, the measurement data acquisition unit 112 may acquire a motor current value.

The data processing unit 114 processes the measurement data acquired by the measurement data acquisition unit 112 and converts it into sign management data that can be used for sign management. The data output unit 116 outputs the sign management data to the management apparatus 200. Since the measurement data is acquired in a time series manner, the sign management data indicates the operating state of the equipment 10 in time series. Examples of the sign management data include an average command current value, a maximum current value, a standard deviation, an amplitude, a suction time, and an average temperature, although the sign management data is not limited to them.

For example, the data processing unit 114 acquires the average command current value, the maximum current value, the standard deviation, the amplitude, and the like using the command current value. The average command current value is, for example, an average value of the command current values in one cycle of the operations of the equipment 10. The maximum current value is, for example, a maximum value of the command current values in one cycle of the operations of the equipment 10. The standard deviation is, for example, a variation from the average value of the command current value. The amplitude is an amplitude of the command current values (a difference between maximum and minimum values in one cycle). Note that the data processing unit 114 may acquire an average value of the amplitudes (average value in one cycle of the operations of the equipment 10) or a maximum value of the amplitudes (maximum value in one cycle of the operations of the equipment 10).

The average command current value, the maximum current value, the standard deviation, and the amplitude tend to increase as the degradation of the bearing or gear (speed reducer 24) of the motor apparatus 20 progresses. Thus, the average command current value, the maximum current value, the standard deviation, and the amplitude may be used to manage signs (i.e., symptoms, presages, predictors or the like) of failures related to the bearing or gear which is a component part of the equipment 10. Here, the term "failure" may include not only a case where the component part does not function at all, but also a case where an operation failure (abnormality) that cannot be performed with sufficient performance.

Further, the data processing unit 114 acquires a motor rotation speed using the encoder value. The motor rotation speed may be calculated from an amount of change in the encoder value (rotation angle). The data processing unit 114 may acquire the average command current value, the maximum current value, the standard deviation, the amplitude, and the like using the command current value when the motor rotation speed is substantially constant (amplitude of the rotation speed fluctuation falls within a certain range). By doing so, the influence of the fluctuation of the motor rotation speed can be eliminated from the average command current value, the maximum current value, the standard deviation, the amplitude, and the like. That is, the average command current value, the maximum current value, the standard deviation, the amplitude, and the like more reliably indicate the progress of degradation (sign of a failure) of each part of the equipment 10.

Further, the data processing unit 114 acquires the suction time from the brake signal. The suction time is a time from when the brake signal (brake release signal) is transmitted to when the brake 26 is actually released and then the joint 14 of the equipment 10 becomes operable. Thus, the data processing unit 114 may also use, as the suction time, a difference between the time when the brake signal is generated and the time when the equipment 10 actually becomes operable (e.g., the time when the encoder value rises or the time when the motor current value rises). The suction time tends to become longer as the disc of the brake 26 wears out. Therefore, the suction time may be used to manage a sign of a failure related to the brake 26 which is a component part of the equipment 10.

The inspection support unit 120 includes a function to support a maintenance worker of the equipment 10 to carry out maintenance work such as an inspection of a component part of the equipment 10. The inspection plan display unit 122 displays information related to the inspection plan created by the inspection plan creation unit 220, which will be described later, on the UI 105. The inspection plan display unit 122 displays, for example, the information related to the inspection plan to be performed today on the UI 105. When the inspection support unit 120 is provided in a mobile terminal, the inspection plan display unit 122 displays information related to an inspection plan to be carried out today on a UI of the mobile terminal. The inspection plan display unit 122 displays, for example, a component part of the equipment 10 to be inspected today.

The failure information input unit 124 receives failure information when the maintenance worker operates the UI 105. The failure information includes the component part where a failure is found, the date when the failure is found, the content of the failure, etc. That is, when the maintenance worker inspects a certain component part and finds a failure, the maintenance worker inputs the failure information using the failure information input unit 124. The failure information input unit 124 outputs the input failure information to the management apparatus 200.

Next, each constituent element of the management apparatus 200 shown in FIG. 2 will be described.

The sign management unit 210 manages a sign that a failure may occur for each component part. The data storage unit 212 acquires the sign management data from the data output unit 116 of the control apparatus 100 and stores it. In particular, the data storage unit 212 may store the sign management data related to a component part where a failure has occurred. Note that the sign management unit 210 does not need to perform the sign management for all the component parts. For example, the sign management unit 210 may perform the sign management for the brake 26 and may not perform the sign management for the speed reducer 24.

The sign information generation unit 214 uses the sign management data to generate sign information that is information for managing a sign of a failure in each component part. The sign information may include, for example, a progress of a value of the sign management data representing a sign of a failure in a corresponding component part and a threshold of the sign management data predicted that a failure may occur. The sign information generation unit 214 may generate the sign information for each component part. For example, assume that a failure has occurred in a component part (e.g., brake 26) of a certain equipment 10 (e.g., equipment #1). In this case, the sign information generation unit 214 generates the sign information based on the progress of the sign management data (e.g., suction time) of the failed component part in time series, a value of the sign management data when the failure has occurred, and a period from when the component part has started operating until when the failure has occurred. Further, when a failure occurs in a component part (e.g., brake 26) in another equipment 10 (e.g., equipment #2), the sign information generation unit 214 may generate the sign information based on an average value of data of the component part of the equipment #1 and data of the component part of the equipment #2.

Figure 3:
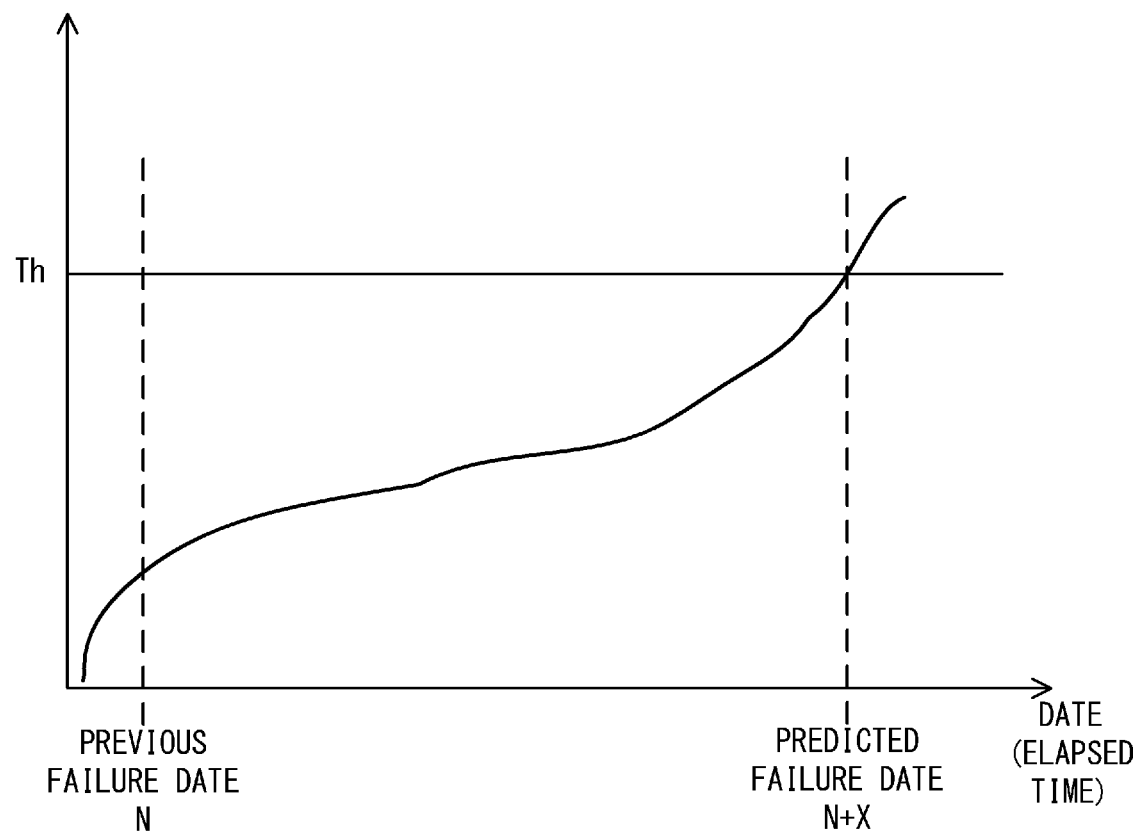
FIG. 3 is a diagram showing an example of sign information according to the first embodiment.

FIG. 3 is a diagram showing an example of the sign information according to the first embodiment. The sign information shown in FIG. 3 is a graph indicating a progress of a value of the sign management data for a certain component part from a previous failure date (i.e., date when the component part is replaced) until a predicted failure date when a failure is predicted to occur. The horizontal axis represents the date (time elapsed), while the vertical axis represents a value of the sign management data (e.g., suction time) indicating a sign of a failure in the corresponding component part. Then, using the sign information (graph) shown in FIG. 3, it is predicted that, on the day (N+X) when X days have passed since the previous failure date N (day), the sign management data reaches Th and a failure occurs in the component part.

The sign judgement unit 216 uses the sign information related to a certain component part (e.g., brake 26) to judge a sign of a failure in this component part of a certain equipment 10. For example, assume that a sign of a failure in a component part (e.g., brake 26) of a certain equipment (e.g., equipment #3) is judged using the sign information shown in FIG. 3. In this case, the sign judgement unit 216 may judge how many days it is predicted that it takes until a failure occurs from the value of the sign management data (e.g., suction time) related to this sign information. The sign judgement unit 216 may further judge the predicted failure date based on, for example, the number of operating days of this component part.

The inspection plan creation unit 220 (FIG. 2) creates an inspection plan for each component part by processing described later. The failure information acquisition unit 222 acquires the failure information from the control apparatus 100. The failure history storage unit 224 stores the acquired failure information as a failure history.

FIG. 4 is a diagram showing an example of the failure history according to the first embodiment. In the example of FIG. 4, the failure history is a history of information including identification information indicating a failed component part, a failure date, and a stopped period. The stopped period is a period from when the equipment 10 including the component part is stopped until it is recovered, in order to replace the failed component part. For example, the failure history shown in FIG. 4 indicates that a component part X1 (component part X of the equipment #1) failed on a date t1, and the stopped period is T1 (minutes). Further, the failure history shown in FIG. 4 indicates that a component part Y1 (component part Y of the equipment #1) failed on a date t2 and the stopped period is T2 (minutes). Furthermore, the failure history shown in FIG. 4 indicates that a component part X2 (component part X of the equipment #2) failed on a date t3 and the stopped period is T3 (minutes). In addition, the failure history shown in FIG. 4 indicates that a component part Y2 (component part Y of the equipment #2) failed on a date t4 and the stopped period is T4 (minutes). Note that the "component part X" is, for example, the motor 22, and the "component part Y" is, for example, the brake 26. The failure history may be generated separately for each component part. That is, the failure history storage unit 224 may store the failure history separately for each of, for example, the motor 22 and the brake 26.

The index acquisition unit 226 (FIG. 2) acquires at least one influence index. Here, the influence index indicates the degree of an influence that a failure in a certain component part has on the operation of the equipment 10. In the first embodiment, the influence indices are the MTTR (Mean Time To Recovery) and MTBF (Mean Time Between Failure). The MTTR is an index (first index) related to the time required for a recovery of the equipment 10 including a component part when the component part fails. The MTBF is an index (second index) related to an operating time, of the equipment including the component part, from a replacement of the component part until the component part fails next time. The MTTR and MTBF are indices that are commonly used to manage the availability and reliability of equipments. Therefore, by using the MTTR and MTBF as the influence indices, it is possible to judge an importance level of an inspection more easily (easy for the user to understand).

Note that a case in which the MTTR of a certain component part is long means that, when the component part fails, the stopped period of the equipment 10 including this component part is long. Thus, when the MTTR is long, it can be said that a failure in the component part has a great influence on the operation of the equipment 10, which makes the MTTR an influence index. That is, the longer the MTTR, the greater the degree of the influence index becomes.

Further, when the MTBF of a certain component part is short, this component part is likely to fail. Thus, when the MTBF is short, it can be said that the influence that a failure in the component part has on the operation of the equipment 10 is large, meaning that the MTBF is related to the influence index. That is, the shorter the MTBF, the greater the degree of the influence index becomes.

Here, the MTTR is defined for each component part (e.g., motor 22 or brake 26). For example, the MTTR of the component part X is defined by the following Formula 1.

$$\text{MTTR} = (\text{Total length of stopped periods of an equipment due to a failure in the component part } X)/(\text{Number of failures in the component part } X) \quad \text{(Formula 1)}$$

The MTBF is defined for each component part (e.g., motor 22 or brake 26). For example, the MTBF of the component part X is defined by the following Formula 2.

$$\text{MTBF} = (\text{Total length of operating periods of an equipment from a timing when the component part } X \text{ has failed previous time until a timing when the component part } X \text{ fails next time})/(\text{Number of failures in the component part } X) \quad \text{(Formula 2)}$$

The operating period of the equipment is a period from when the equipment is recovered and starts operating after the component part X has failed previous time until when the component part X fails next time.

The importance level judgement unit 228 judges the importance level of an inspection on the component part based on the influence index. The inspection time determination unit 232 determines the inspection time of the component part according to the importance level. The inspection plan output unit 234 creates and outputs the inspection plan for the component part from the determined inspection time. Further, the candidate calculation unit 230 calculates an inspection time candidate of the component part based on the time when the component part is predicted to fail. Note that specific processing of the index acquisition unit 226, the importance level judgement unit 228, the inspection time determination unit 232, the inspection plan output unit 234, and the candidate calculation unit 230 will be described later.

The spare part management unit 236 manages a spare part for each component part based on the created inspection plan. For example, when the inspection time or regular replacement time is approaching for a certain component part, the spare part management unit 236 orders the spare part for that component part. The spare part management unit 236 manages the number of spare parts for each component part.

Figure 5:
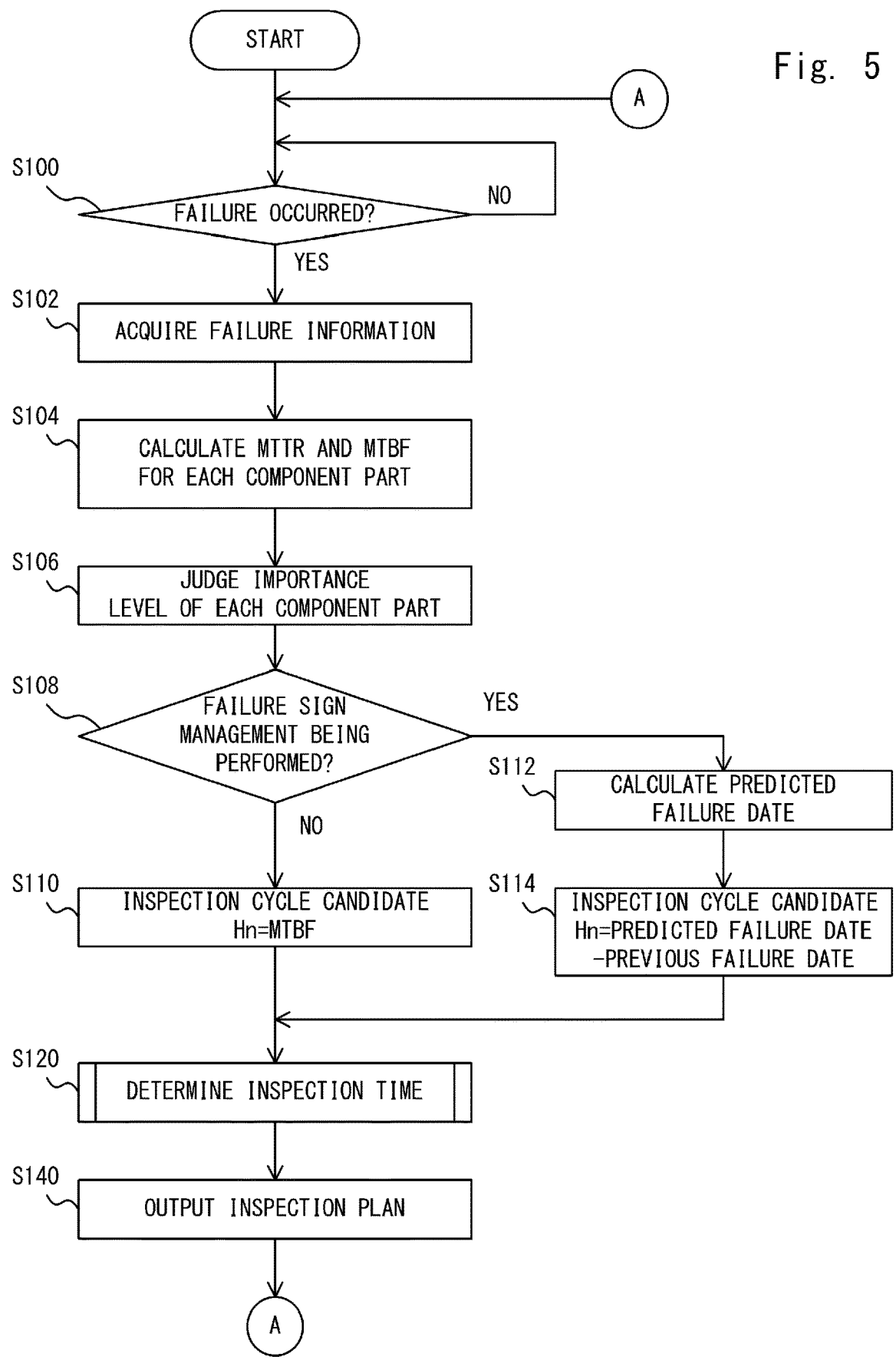
FIG. 5 is a flowchart showing an equipment inspection method executed by the equipment inspection system according to the first embodiment.

FIG. 5 is a flowchart of an equipment inspection method executed by the equipment inspection system 1 according to the first embodiment. The equipment inspection system 1 performs processing shown in FIG. 5 for each component part to be managed, for example, every time a failure occurs. Here, the processing shown in FIG. 5 is executed mainly by the inspection plan creation unit 220 of the management apparatus 200.

When a failure occurs in a component part to be managed (YES in Step S100), the management apparatus 200 acquires the failure information (Step S102). Specifically, as described above, the failure information acquisition unit 222 of the management apparatus 200 acquires, from the control apparatus 100, failure information of the component part (e.g., motor 22 or brake 26) to be managed in each equipment 10. For example, when the component part to be managed is the motor 22, the failure information acquisition unit 222 acquires the failure information related to the motor 22 for each of the plurality of equipments 10. The failure history storage unit 224 stores the acquired failure history as shown in FIG. 4.

Next, the management apparatus 200 calculates MTTR and MTBF for each component part (Step S104). Specifically, the index acquisition unit 226 of the management apparatus 200 calculates the MTTR and MTBF of the component part to be managed as the influence indices. Here, when the component part to be managed is the motor 22, the index acquisition unit 226 calculates the MTTR and MTBF of the motor 22.

Here, a method of calculating the MTTR when the component part to be managed is the motor 22 will be described. The index acquisition unit 226 totals (sums up) the stopped periods caused by failures in the motor 22 in the failure history. Here, in the example of FIG. 4, assume that the component part X is the motor 22. At this time, since the motor 22 (component part X) has failed on the failure dates $t1$, $t3$, $t5$, and $t7$, the index acquisition unit 226 totals stopped periods $T1$, $T3$, $T5$, and $T7$. Further, in the example of FIG. 4, the number of failures in the motor 22 (component part X) is four. Therefore, in this case, the index acquisition unit 226 calculates the MTTR of the motor 22 (component part X) from Formula 1 as MTTR=$(T1+T3+T5+T7)/4$.

A method of calculating the MTBF when the component part to be managed is the motor 22 will be further described. The index acquisition unit 226 sums up periods, in the failure history, from when a failure has occurred in the motor 22 previous time and the equipment 10 is recovered and starts operating until the motor 22 fails next time. In the example shown in FIG. 4, it is assumed that the component part X is the motor 22. At this time, in the equipment #1, the motor 22 (component part X1) fails on the failure date $t1$, and then the motor 22 (component part X1) fails on the failure date $t5$. Thus, in regard to the equipment #1, the operating period from the previous failure date to the next failure date of the motor 22 is $(t5-t1)$. Likewise, in regard to the equipment #2, the operating period from the previous failure date to the next failure date of the motor 22 is $(t7-t3)$. In this case, the number of failures is two, excluding a failure occurred on the previous failure date. Therefore, in this case, the index acquisition unit 226 calculates the MTBF of the motor 22 (component part X) from Formula 2 as MTBF=$\{(t5-t1)+(t7-t3)\}/2$.

When the failure date $t1$ is indicated by the date and time, the equipment #1 fails at $t1$ and is recovered after $T1$. Thus, in regard to the equipment #1, the operating period from when the motor 22 is recovered on the previous failure date until when a failure occurs on the next failure date is $(t5-(t1+T1))$. Likewise, in this case, in regard to the equipment #2, the operating period from the timing when the motor 22 is recovered on the previous failure date until the timing when a failure occurs on the next failure date is $(t7-(t3+T3))$. Thus, in this case, the index acquisition unit 226 calculates the MTBF of the motor 22 (component part X) from Formula 2 as MTBF=$\{(t5-(t1+T1))+(t7-(t3+T3))\}/2$.

Next, the management apparatus 200 judges an importance level of an inspection for each component part (Step S106). Specifically, the importance level judgement unit 228 of the management apparatus 200 judges an importance level of an inspection on a component part to be managed according to the MTTR and MTBF. To be more specific, the importance level judgement unit 228 may judge the importance level using, for example, an importance level judgement chart shown in FIG. 6. Here, as will be described below, the importance level is determined in such a way that the higher the degree of the influence index, the higher the importance level of an inspection on the component parts becomes.

Figure 6:
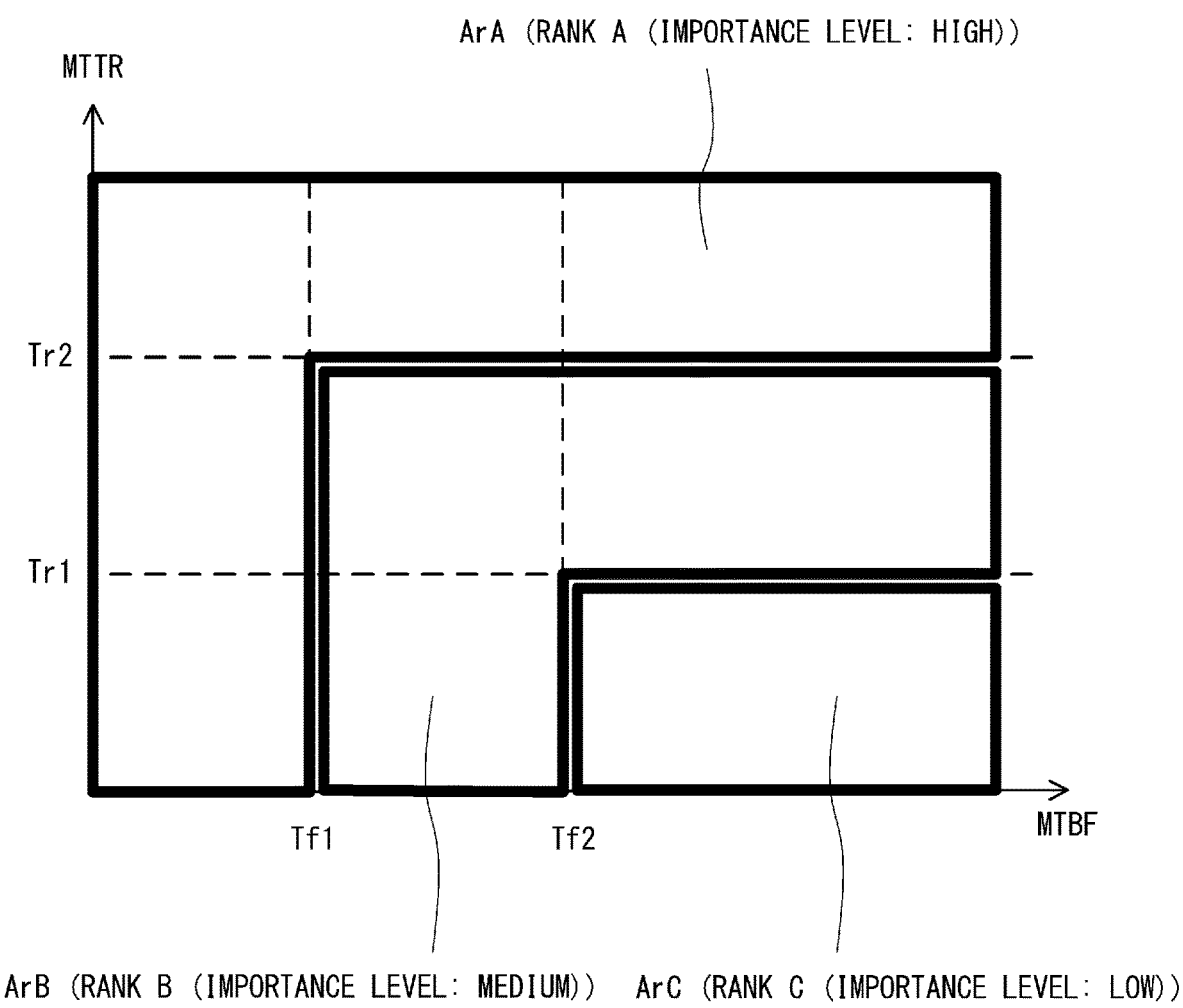
FIG. 6 is a diagram showing an importance level judgement chart according to the first embodiment.

FIG. 6 is a diagram showing an example of the importance level judgement chart according to the first embodiment. In the first embodiment, since the importance level of an inspection on the component part is judged according to the two influence indices (MTTR and MTBF), the importance level judgement chart is configured in two dimensions. In the importance level judgement chart shown in FIG. 6, three regions ArA, ArB, and ArC are defined according to lengths of the MTTR and MTBF. The region ArA is a region corresponding to a "rank A" with the highest importance level of an inspection. The region ArB is a region corresponding to a "rank B" with a medium importance level of an inspection. The region ArC is a region corresponding to a "rank C" with the lowest importance level of an inspection. The number of ranks of the importance level is not limited to three as shown in FIG. 6. Here, Tr1 and Tr2 are threshold values for the MTTR, where Tr1<Tr2. Tf1 and Tf2 are threshold values for the MTBF, where Tf1<Tf2.

The component part ranked in the rank A is, for example, a component part that cannot be repaired during an operation of the equipment when a failure occurs and thus needs to be stopped for such a long time that greatly affects production management, or a component part with a high possibility that a failure may occur by the regular replacement time (time of equipment overhaul). Therefore, it can be said that the level of the influence that the component part ranked in the rank A has on the production activity of the entire factory is high. The component part ranked in the rank B is, for example, a component part that need to be stopped for such a time that does not affect the production management when a failure occurs, or a component part with a relatively high possibility that a failure may occur by the regular replacement time. Thus, it can be said that the level of the influence exerted by the component part ranked in the rank B on the production activity of the entire factory is lower than that exerted by the component part ranked in the rank A on the production activity of the entire factory. Further, the component part ranked in the rank C can be, for example, repaired during the operation of the equipment (e.g., during a daily break time) and is a component part with an extremely low possibility that a failure may occur by the regular replacement time. It is therefore can be said that the level of the influence exerted by the component part ranked in the rank C on the production activity of the entire factory is lower than the that exerted by the component part ranked in the rank B on the production activity of the entire factory.

Here, the region ArA is a region where the MTTR is greater than or equal or Tr2, or the MTBF is less than or equal to Tf1. The region ArC is a region where the MTTR is less than Tr1 and the MTBF exceeds Tf2. The region ArB is a region excluding the regions ArA and ArC. For example, when MTTR=MTTR_a (>Tr2) is calculated for the component part X (motor 22) in the processing of S104, the importance level judgement unit 228 judges the importance level of an inspection on the component part X (motor 22) as the rank A. In this case, it means that the influence exerted by the failure in the component part X on the equipment 10 is large. For example, in the processing of S104, when it is calculated that MTTR=MTTR_b (<Tr1) and MTBF=MTBF_b (>Tf2) for the component part Y (brake 26), the importance level judgement unit 228 judges that the importance level of an inspection on the component part Y (brake 26) as the rank C. In this case, it means that the influence exerted by the failure in the component part Y on the facility 10 is small.

Next, the inspection plan creation unit 220 of the management apparatus 200 judges whether the sign management for failures is being performed for the component part to be managed (Step S108). For example, assume that the sign management unit 210 is not performing the sign management for failures in the component part X (motor 22) whereas it is performing the sign management for failures in the component part Y (brake 26). In this case, when the component part to be managed is the component part X, the inspection plan creation unit 220 (e.g., candidate calculation unit 230) judges that the sign management for failures is not being performed (NO in S108). On the other hand, when the component part to be managed is the component part Y, the inspection plan creation unit 220 (e.g., candidate calculation unit 230) judges that the sign management for failures is being performed (YES in S108).

When the sign management for failures is not being performed for the component part to be managed (NO in S108), the candidate calculation unit 230 calculates a candidate for the inspection cycle (inspection cycle candidate) Hn as the MTBF calculated in the processing of S104 (Step S110). That is, the candidate calculation unit 230 sets Hn=MTBF. On the other hand, when the sign management for failures is being performed for the component part to be managed (YES in S108), the candidate calculation unit 230 calculates the predicted failure date using the sign information shown in FIG. 3 (Step S112). Then, the candidate calculation unit 230 sets the inspection cycle candidate Hn as a period from the previous failure date to the predicted failure date (Step S114). That is, the candidate calculation unit 230 sets Hn=(predicted failure date−previous failure date)=X (day). By doing so, the inspection time can be determined according to the predicted failure date predicted by the sign management, which makes it possible to create an inspection plan with higher accuracy.

The management apparatus 200 determines the inspection time (Step S120). Specifically, the inspection time determination unit 232 determines the inspection time of the component part according to the importance level judged in the processing of S106 and the inspection cycle candidate calculated in the processing of S110 or S114. The specific processing of S120 will be described later with reference to FIG. 7.

Figure 7:
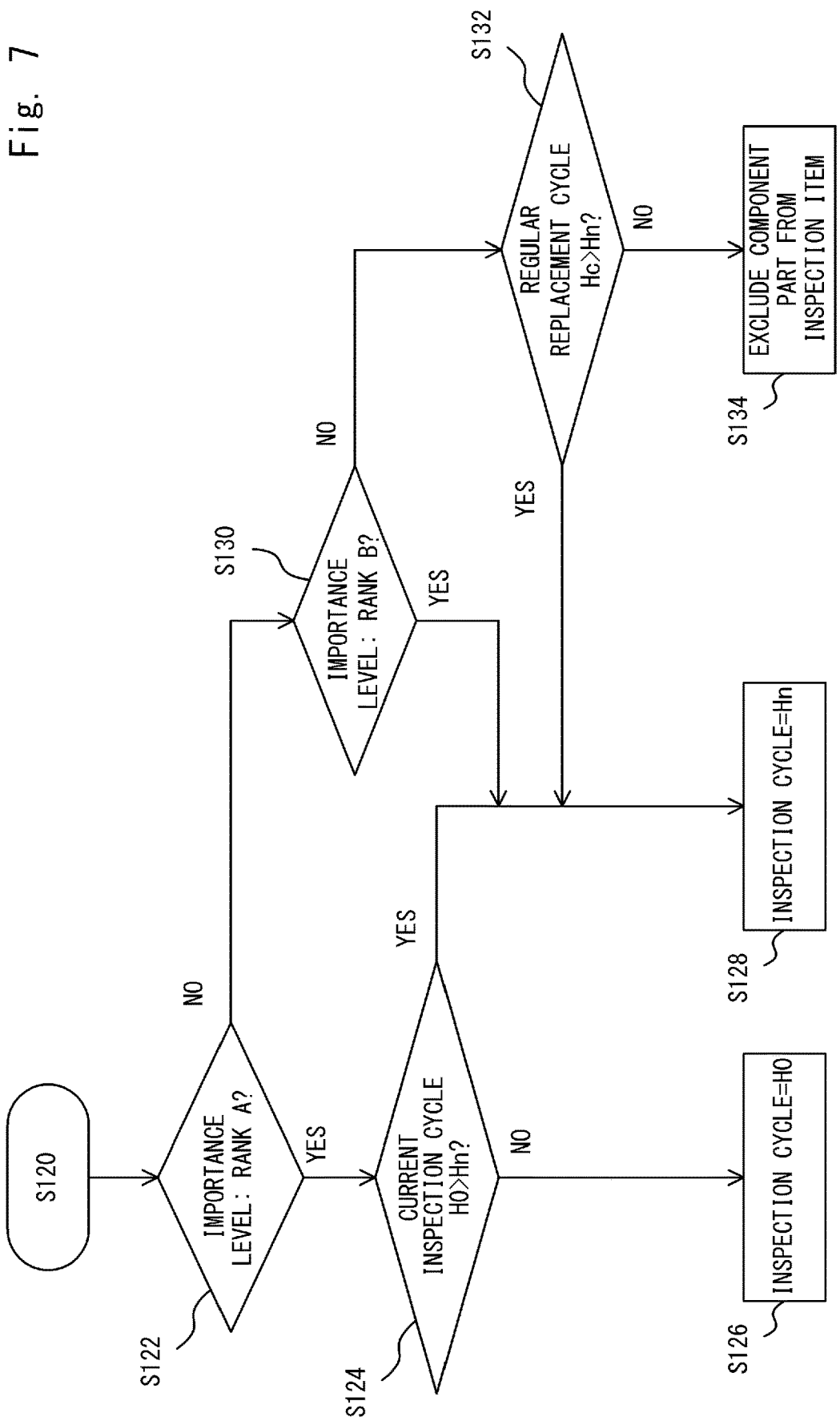
FIG. 7 is a flowchart showing processing executed by an inspection time determination unit according to the first embodiment.

FIG. 7 is a flowchart showing the processing (S120) executed by the inspection time determination unit 232 according to the first embodiment. The inspection time determination unit 232 judges whether the rank of the importance level determined in the processing of S106 is the "rank A (importance level: high)" (Step S122). When the rank of the importance level is the rank A (YES in S122), the inspection time determination unit 232 judges whether a current inspection cycle H0 is longer than the inspection cycle candidate Hn (H0>Hn) (Step S124). When H0>Hn does not hold, namely, when the current inspection cycle H0 is less than or equal to the inspection cycle candidate Hn (NO in S124), the inspection time determination unit 232 determines the inspection cycle as H0 (Step S126). That is, in this case, the inspection time determination unit 232 does not update the inspection time. On the other hand, when H0>Hn holds, namely, when the current inspection cycle H0 is longer than the inspection cycle candidate Hn (YES in S124), the inspection time determination unit 232 determines the inspection cycle as Hn (Step S128). That is, in this case, the inspection time determination unit 232 updates the inspection time to Hn. When the rank of the importance level is the rank A, the importance level of an inspection of this component part is high. Thus, the inspection cycle is determined to be shorter, namely, a shorter one of H0 and Hn is determined as the inspection cycle.

On the other hand, when the rank of the importance level is not the rank A (NO in S122), the inspection time determination unit 232 judges whether the rank of the importance level determined in the processing of S106 is the "rank B (importance level: medium)" (Step S130). When the rank of the importance level is the rank B (YES in S130), the inspection time determination unit 232 determines the inspection cycle as Hn (Step S128). That is, when the rank of the importance level is the rank B, the inspection time determination unit 232 always updates the inspection time to Hn. In other words, when the rank of the importance level is the rank B, the inspection time determination unit 232 updates the inspection time to the latest inspection cycle candidate.

On the other hand, when the rank of the importance level is not the rank B (NO in S130), the rank of the importance level is the "rank C (importance level: low)". In this case, the inspection time determination unit 232 judges whether the regular replacement cycle Hc of the component part to be managed is longer than the inspection cycle candidate Hn (Hc>Hn) (Step S132). Here, the regular replacement cycle Hc is a period previously determined for each component by a manufacturer of the component part. When Hc>Hn holds, namely, when the regular replacement cycle Hc is longer than the inspection cycle candidate Hn (YES in S132), the inspection time determination unit 232 determines the inspection cycle as Hn (Step S128). That is, in this case, the inspection time determination unit 232 updates the inspection time to the latest inspection cycle candidate.

On the other hand, when Hc>Hn does not hold, namely, when the regular replacement cycle Hc is less than or equal to the inspection cycle candidate Hn (NO in S132), the inspection time determination unit 232 excludes the component part to be managed from the inspection items (Step S134). The regular replacement cycle Hc being less than or equal to the inspection cycle candidate Hn means that the predetermined regular replacement time comes before the inspection time candidate. In this case, for this component part, the importance level of an inspection is lower than or equal to a predetermined rank (rank C or lower in the example of first embodiment), and the predetermined regular replacement time comes before the inspection time candidate, there is almost no need to inspect this component part. For example, there is a very high possibility that the component part will be replaced before the component part fails. For this reason, this component part is excluded from the inspection items. This reduces the number of inspection items and also effectively prevents an inspection on the component part that rarely needs to be inspected, thereby improving the efficiency of the inspection work.

The management apparatus 200 generates an inspection plan according to the inspection time determined in S120 for each component part and outputs the generated inspection plan to the inspection support unit 120 of the control apparatus 100 (or worker's mobile terminal) (Step S140 in FIG. 5). Then, the inspection plan display unit 122 displays the inspection plan on the UI 105 (or the UI of the mobile terminal). Specifically, the inspection plan output unit 234 determines the inspection time (scheduled inspection date) of each component part from the inspection cycle determined in the processing of S120 and the previous failure date of the component part of each equipment 10 (recovery date of the equipment 10). In this manner, the inspection plan output unit 234 creates the inspection plan. Then, the inspection plan output unit 234 outputs a notification that the component part should be inspected today to the control apparatus 100 (or worker's mobile terminal) of the equipment 10 including the component part in which today is the inspection time. For example, in the example of FIG. 4, when the scheduled inspection date of the component part X1 is today, the inspection plan output unit 234 outputs a notification that the component part X1 should be inspected today to the control apparatus 100 (or worker's mobile terminal) of the equipment 10 (equipment #1) including the component part X1.

Then, when a failure occurs in the component part to be managed (YES in S100), the management apparatus 200 performs the processing of S102 to S140 again. Specifically, assume that a failure has occurred in a component part of the same type as that of a component part which failed previous time in an equipment different from an equipment 10 of the component part which failed previous time. For example, in the example of FIG. 4, assume that a failure has occurred in the component part X (component part X1) of the equipment #1 previous time and a failure has occurred in the component part X (component part X2) of the equipment #2 this time. In this case, the failure information acquisition unit 222 acquires failure information newly generated for the component part X2 from the inspection support unit 120 (S102), and the index acquisition unit 226 calculates the MTTR and MTBF (S104). Then, the importance level judgement unit 228 judges the importance level of an inspection using the newly calculated MTTR and MTBF (S106), and the inspection time determination unit 232 determines the inspection time according to the newly judged importance level (S120). Here, the MTTR and MTBF calculated this time may differ from the previously calculated MTTR and MTBF, respectively. Thus, when a failure occurs in a component part, the importance level judgement unit 228 updates the importance level of an inspection on the component part, and the inspection time determination unit 232 updates the inspection time (inspection cycle) of the component part.

As described above, the equipment inspection system 1 according to the first embodiment is configured to judge the importance level of an inspection on the component part of the equipment 10 based on the influence indices such as the MTTR and MTBF and to determine the inspection time (inspection cycle) of the component part according to the judged importance level. As described above, in the equipment inspection system 1 according to the first embodiment, an inspection plan is created in consideration of the importance level of an inspection on each component part of the equipment 10, which makes it possible to create the inspection plan in which an inspection is performed at an appropriate timing for each component part. That is, it is possible to create an inspection plan such that a long inspection cycle is set for a component part that only requires a long inspection cycle while a short inspection cycle is set for a component part that requires a short inspection cycle.

Further, as described above, the equipment inspection system 1 according to the first embodiment is configured, every time a failure occurs in the component part, to acquire (calculate) the influence indices (MTTR and MTBF), to update the importance level of an inspection, and to update the inspection cycle (inspection time). Here, the calculated MTTR and MTBF may vary by an improvement in the maintenance activity of the equipment. Specifically, for example, the MTTR can be shortened by improving the efficiency of any one of a series of operations from when a component part fails and the equipment 10 is stopped until repair or replacement work is performed on the component part to recover (restart) the equipment 10. This makes it possible to lower the degree of the influence index for the MTTR. Likewise, the MTBF can be lengthened by, for example, improving the component part to the one that is less likely to fail to thereby improve reliability of the component part. This makes it possible to lower the degree of the influence index for the MTBF. Therefore, the importance level of an inspection on the component part can be lowered by improving the maintenance activity and making the values of the MTTR and MTBF favorable (i.e., the degrees of the influence indices are lowered). Then, the inspection cycle can be lengthened. Even when the rank of the importance level of an inspection is not lowered and does not change, the inspection cycle candidate Hn can be lengthened by an increase in the MTBF, so that the inspection period can be lengthened.

Considering the safety and reliability of the equipment 10, it seems that a short inspection cycle is preferable. However, excessive inspections beyond the required frequency may hinder the improvement in the efficiency of an inspection work. On the other hand, the equipment inspection system 1 according to the first embodiment is configured to acquire an influence index and update an inspection cycle (inspection time) every time a failure occurs in a component part. For a certain component part, the MTBF is lengthened by improving the maintenance activity of an equipment, which enables the inspection cycle to be lengthened by the processing of S110 of FIG. 5 and the processing of S128 of FIG. 7. Thus, in the first embodiment, it is possible to prevent excessive inspections beyond the necessary frequency. Therefore, in the first embodiment, it is possible to create an inspection plan that appropriately reflects the decrease in the degree of the influence index by the improvement of the maintenance work.

Further, the equipment inspection system 1 according to the first embodiment is configured to update the importance level of an inspection every time a failure occurs in a component part. Since the importance level is the rank A (importance level: high) at first, it has been necessary to set a short inspection cycle. However, when the MTTR can be shortened and MTBF can be lengthened, the rank of the importance level may be lowered. For example, for a certain component part, the MTTR has been greater than or equal to Tr2. However, the rank of the importance level can be lowered from the rank A to the rank B due to the MTTR becoming less than Tr2 by an improvement in the maintenance activity of the equipment. In such a case, in the first embodiment, it is possible to determine a long inspection cycle (inspection time) corresponding to the lowered rank of the importance level. For another component part, for example, the rank of the importance level has been the rank B. However, when the MTTR can be shortened and the MTBF can be lengthened by an improvement in the maintenance activity of the equipment, the rank of the importance level could be lowered to the rank C. In such a case, the component part can be excluded from the inspection items depending on the condition of S132. Therefore, in the first embodiment, when the degree of the influence index is lowered by an improvement of the maintenance activity of the equipment, it is possible to prevent excessive inspections beyond the necessary frequency.

Figure 8:
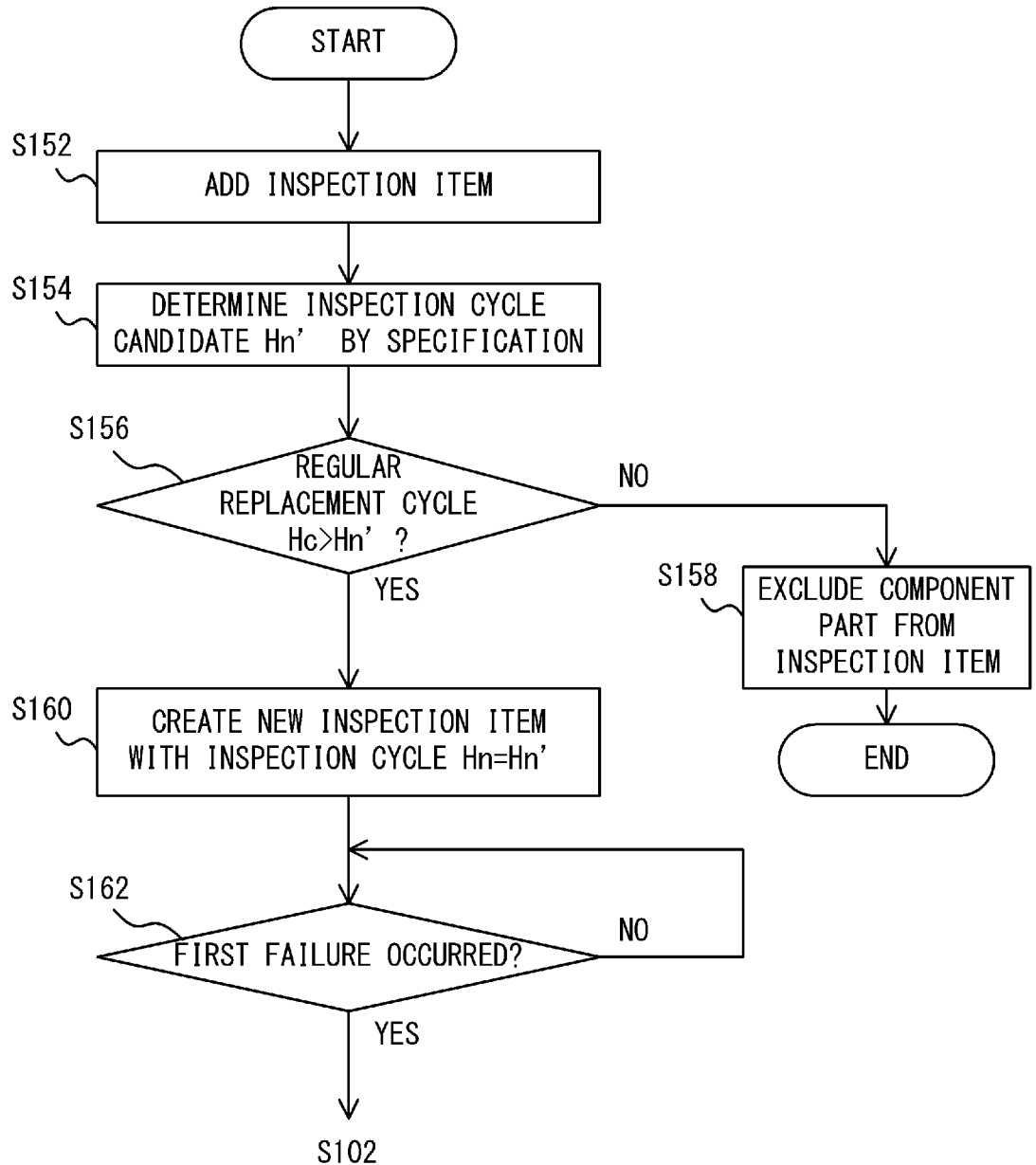
FIG. 8 is a flowchart showing processing when an inspection item is added for a certain component part in the first embodiment.

FIG. 8 is a flowchart showing processing when an inspection item for a certain component part is added in the first embodiment. First, the inspection plan creation unit 220 adds an inspection item (Step S152). Specifically, when a new component part is introduced by an update of the model of the equipment 10 or the like, the inspection plan creation unit 220 creates an inspection plan in which an inspection item related to the component part is added. At this time, the inspection plan creation unit 220 may associate information (identification information, etc.) regarding the component part with the inspection item.

The inspection plan creation unit 220 determines an inspection cycle candidate Hn' according to the specification (Step S154). Specifically, the inspection plan creation unit 220 determines the inspection cycle candidate Hn' based on the inspection cycle and a life of the equipment 10 indicated in the specification predetermined by a manufacturer of the component part. Note that the life of the equipment 10 may be determined based on the shortest life among lives of a plurality of component parts constituting the equipment 10. For example, when the inspection cycle indicated in the specification of the component part is shorter than the life of the equipment 10, the inspection plan creation unit 220 may determine the inspection cycle indicated in the specification of the component part as the inspection cycle candidate Hn'. On the other hand, for example, when the inspection cycle indicated in the specification of the component part is longer than the life of the equipment 10, the inspection plan creation unit 220 may determine the life of the equipment 10 as the inspection cycle candidate Hn'.

The inspection plan creation unit 220 judges whether the regular replacement cycle Hc indicated in the specification of the component part is longer than the inspection cycle candidate Hn' (Step S156). The regular replacement cycle Hc may be the same as the regular replacement cycle Hc shown in FIG. 7. When the regular replacement cycle Hc indicated in the specification of the component part is not longer than the inspection cycle candidate Hn' (NO in S156), the regular replacement time corresponding to the regular replacement cycle He comes before the inspection time corresponding to the inspection cycle candidate Hn'. Therefore, an inspection of this component part becomes unnecessary. Thus, the inspection plan creation unit 220 excludes this component part from the inspection items (Step S158). That is, no inspection item is registered for this component part. For example, a battery of the control panel needs to be replaced every two months, while the inspection cycle of the component part of the control panel may be adjusted to the inspection cycle of the control panel, which is longer than two months. In such a case, the battery, which is a component part of the control panel, can be excluded from the inspection items.

On the other hand, when the regular replacement cycle Hc indicated in the specification of the component part is longer than the inspection cycle candidate Hn' (YES in S156), the inspection plan creation unit 220 creates a new inspection item in the inspection plan with the inspection cycle candidate Hn' as the inspection cycle (Step S160). Then, when a first failure occurs in the component part (YES in Step S162), the processing proceeds to S102 in FIG. 5, and the inspection cycle is determined (updated).

Second Embodiment

Next, a second embodiment will be described. In the second embodiment, an influence index used to judge an importance level of an inspection differs from that in the first embodiment. Since a configuration of an equipment inspection system 1 according to the second embodiment is substantially the same as that shown in FIG. 2, the description thereof is omitted.

Figure 9:
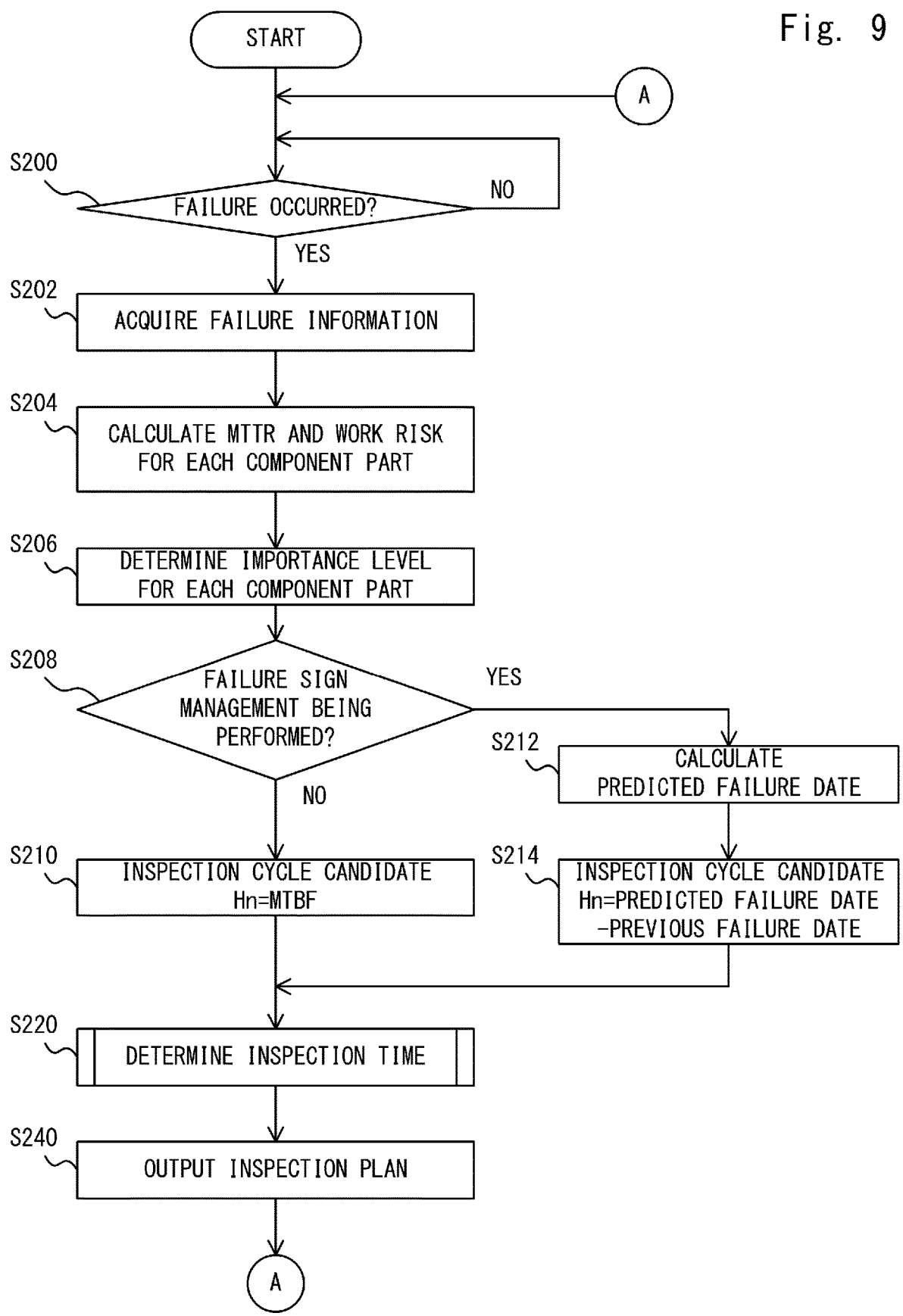
FIG. 9 is a flowchart showing an equipment inspection method executed by an equipment inspection system according to a second embodiment.

FIG. 9 is a flowchart of an equipment inspection method executed by the equipment inspection system 1 according to the second embodiment. The equipment inspection system 1 performs processing shown in FIG. 9 for each component part to be managed, for example, every time a failure occurs. Here, the processing shown in FIG. 9 is mainly executed by the inspection plan creation unit 220 of the management apparatus 200.

When a failure occurs in a component part to be managed (YES in Step S200), the failure information acquisition unit 222 of the management apparatus 200 acquires failure information (Step S202), in a manner similar to S102 of FIG. 5. The failure history storage unit 224 stores the acquired failure history as shown in FIG. 4. Here, the failure information according to the second embodiment may include work risk information indicating a rank of a work risk (work risk rank) for each component part in addition to a failure date and a stopped period of each component part as shown in FIG. 4. The work risk will be described later. The work risk information may be generated, for example, when a maintenance worker inputs the work risk information in accordance with a predetermined rule. Thus, the work risk information may be input when the maintenance worker operates the UI 105 of the control apparatus 100 (or the UI of the mobile terminal).

Next, the index acquisition unit 226 of the management apparatus 200 acquires the MTTR and work risk for each component part (Step S204). That is, the index acquisition unit 226 according to the second embodiment acquires the MTTR and work risk as influence indices. The method of acquiring (calculating) the MTTR is substantially the same as the method described in the first embodiment, and thus the description thereof is omitted.

The work risk is an influence index indicating a degree of a risk (difficulty level) of maintenance work for the corresponding component part. For example, a heavy component part (e.g., speed reducer 24) or a component located at a high position (e.g., motor 22) needs to be, for example, removed, carried, and attached using a special equipment (such as a crane or an aerial work vehicle), which requires a large number of man-hours and a high cost. Since it can be said that such component parts affect the operation of the equipment, the work risk rank is high, namely, the degree of the influence index is high. On the other hand, work can be carried out without requiring a special device on a light component part or a component part located at a low position, and thus it is less likely that a large number of man-hours and a high cost are needed. Since it can be said that such component parts do not significantly affect the operation of the equipment, the work risk rank is low, namely, the degree of the influence index is low.

Next, the management apparatus 200 judges the importance level of an inspection for each component part (Step S206). Specifically, in the second embodiment, the importance level judgement unit 228 of the management apparatus 200 judges the importance level of an inspection on the component part according to the MTTR and the work risk. More specifically, the importance level judgement unit 228 according to the second embodiment may judge the importance level using, for example, an importance level judgement chart shown in FIG. 10. Also in the second embodiment, as will be described below, the importance level is judged in such a way that the higher the degree of the influence index, the higher the importance level of an inspection on the component parts becomes.

Figure 10:
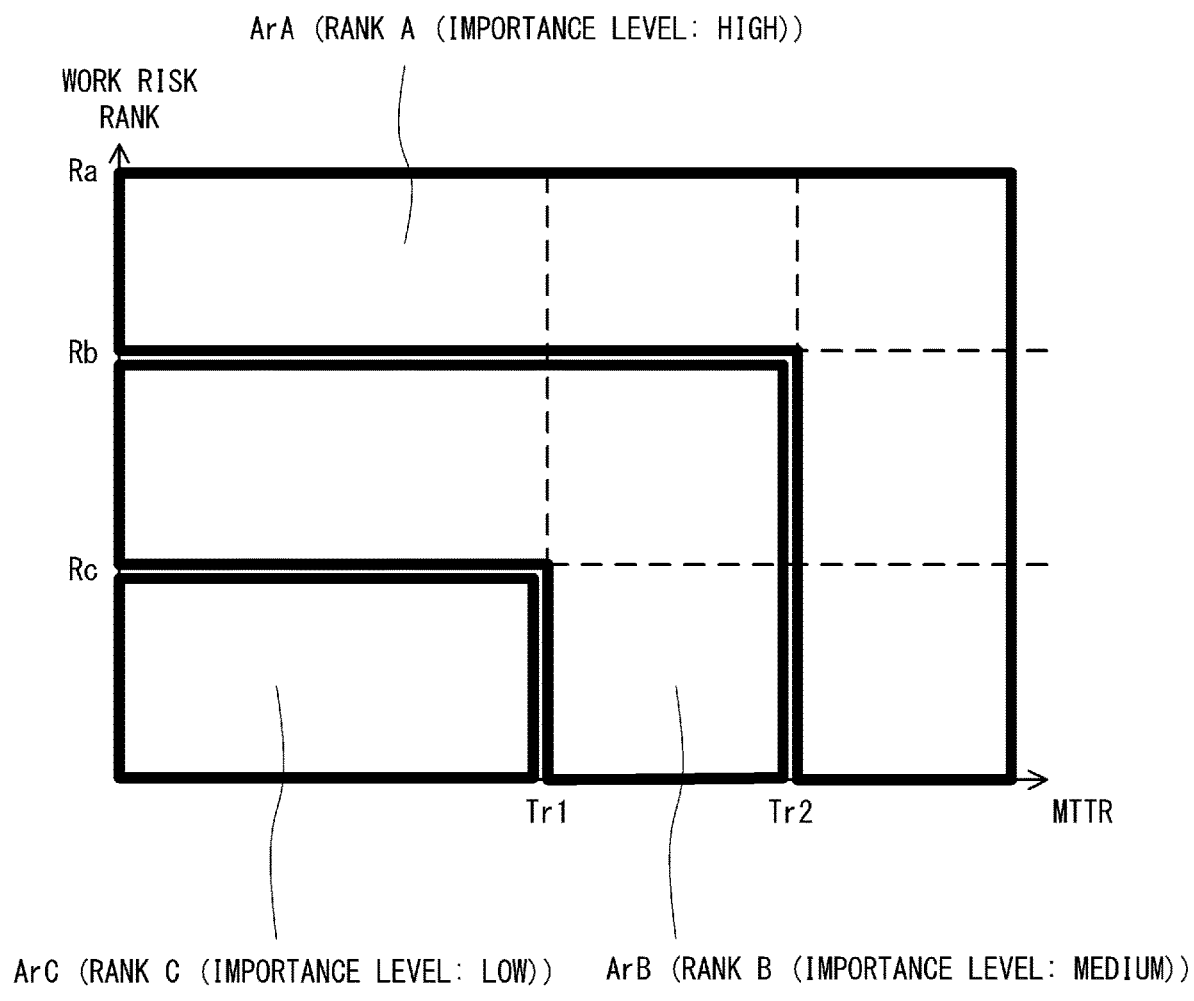
FIG. 10 is a diagram showing an example of an importance level judgement chart according to the second embodiment.

FIG. 10 is a diagram showing an example of the importance level judgement chart according to the second embodiment. In the first embodiment, since the importance level of an inspection on the component part is judged according to the two influence indices (MTTR and work risk), the importance level judgement chart is configured in two dimensions. In the importance level judgement chart shown in FIG. 10, three regions ArA, ArB, and ArC are defined according to a length of the MTTR and the work risk rank. The region ArA is a region corresponding to a "rank A" with the highest importance level of an inspection. The region ArB is a region corresponding to a "rank B" with a medium importance level of an inspection. The region ArC is a region corresponding to a "rank C" with the lowest importance level of an inspection. The number of ranks of the importance level is not limited to three as shown in FIG. 10. Here, Tr1 and Tr2 are threshold values for the MTTR, where Tr1<Tr2. Ra, Rb, and Rc are threshold values for the work risk rank, where Ra>Rb>Rc.

The component part ranked in the rank A is, for example, a component part that cannot be repaired during an operation of the equipment when a failure occurs and thus needs to be stopped for such a long time that greatly affects production management or a component part with a high difficulty of an inspection work. Therefore, it can be said that the level of the influence that the component part ranked in the rank A has on the production activity of the entire factory is high. The component part ranked in the rank B is, for example, a component part that need to be stopped for such a period that does not affect the production management when a failure occurs or a component part with a medium level of difficulty of an inspection work. Thus, it can be said that the level of the influence exerted by the component part ranked in the rank B on the production activity of the entire factory is lower than that exerted by the component part ranked in the rank A on the production activity of the entire factory. In addition, the component part ranked in the rank C is a component part that can be repaired during operation of the equipment (e.g., during a daily break time) and has a low difficulty of an inspection work. Therefore, it can be said that the level of the influence exerted by the component part ranked in the rank C on the production activity of the entire factory is lower than that exerted by the component part ranked in the rank B on the production activity of the entire factory.

Here, the region ArA is a region where the MTTR is greater than or equal to Tr2 or the work risk rank is higher than or equal to Rb. The region ArC is a region where the MTTR is less than Tr1 and the work risk rank is less than Rc. The region ArB is a region excluding the regions ArA and ArC. For example, when the work risk rank=Rx (>Rb) is calculated for the component part X (motor 22) in the processing of S204, the importance level judgement unit 228 judges the importance level of an inspection on the component part X (motor 22) as the rank A. In this case, it means that the influence exerted by the failure in the component part X on the equipment 10 is large. For example, in the processing of S204, when it is calculated that MTTR=MTTR_y (<Tr1) and the work risk rank=Ry (>Rc) for the component part Y (brake 26), the importance level judgement unit 228 judges that the importance level of an inspection on the component part Y (brake 26) as the rank C. In this case, it means that the influence exerted by the failure in the component part Y on the facility 10 is small.

Further, the candidate calculation unit 230 of the management apparatus 200 according to the second embodiment performs processing of calculating the inspection cycle candidate Hn in a manner similar to that in the first embodiment (S208 to S214). Like in the first embodiment, the inspection time determination unit 232 of the management apparatus 200 according to the second embodiment determines the inspection time of the component part according to the importance level judged in the processing of S206 and the inspection cycle calculated in the processing of S210 or S214 (S220). In a manner similar to the first embodiment, the inspection plan output unit 234 of the management apparatus 200 according to the second embodiment generates an inspection plan according to the inspection time determined in S220 for each component part and outputs the generated inspection plan to the inspection support unit 120 of the control apparatus 100 (or worker's mobile terminal) (S240). Note that the processing of S208 to S240 is substantially the same as the processing of S108 to S140, respectively, and thus the description thereof is omitted.

As described above, the equipment inspection system 1 according to the second embodiment is configured to judge the importance level of an inspection on the component part of the equipment 10 based on the influence indices such as the MTTR and work risk and to determine the inspection time (inspection cycle) of the component part according to the judged importance level. Therefore, also in the equipment inspection system 1 according to the second embodiment, it is possible to achieve substantially the same effects as the above-described effects brought about by the equipment inspection system 1 according to the first embodiment.

MODIFIED EXAMPLE

Note that the present disclosure is not limited to the above-described embodiments and can be appropriately changed without departing from the spirit of the present disclosure. For example, the order of the above-described steps in the flowchart may be changed as appropriate. Further, one or more of the steps in the flowchart may be omitted. For example, in the flowchart shown in FIG. 5, the processing of S108 to S114 may be performed before the processing of S106. Further, the processing of S108 to S114 may not be performed. The same applies to FIG. 9.

Furthermore, in the above-described embodiments, although the MTTR, MTBF, and work risk are described as examples of the influence index, the influence index is not limited to the above examples. For example, the influence index may be an operating rate (=MTBF/(MTBF+MTTR)).

Moreover, in the above-described embodiments, as shown in FIGS. 6 and 10, the importance level of an inspection is judged using two influence indices. However, the number of influence indices used to judge the importance level of an inspection is not limited to two and may be one, or may be three or more. When the number of influence indices used to judge the importance level of an inspection is one, the importance level may be judged using a one-dimensional importance level judgement chart. When the number of influence indices used to judge the importance level of an inspection is three, the importance level may be judged using a three-dimensional importance level judgement chart.

In the above-described embodiments, the inspection time determination unit 232 determines the inspection cycle for each component part. However, the inspection time determination unit 232 may determine the inspection time for each component part. Specifically, for example, inspection time candidates may be calculated in the processing of S110 and S114 (S210 and S214) for each of different component parts of the same type (such as component part X1 and component part X2 in the example of FIG. 4). Then, in the processing of S120 (S220), the inspection time may be determined by replacing the "inspection cycle" with the "inspection time".

In the above examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An equipment inspection system comprising:
   hardware, including at least one memory configured to store a computer program and at least one processor configured to execute the computer program;
   an index acquisition unit, implemented by the hardware, configured to acquire at least one influence index indicating a degree of an influence exerted by a failure in a component part of an equipment on an operation of the equipment, wherein the influence index includes a first index related to a time required for a recovery of the equipment including the component part when the component part fails and a second index related to an operating time of the equipment including the component part from when the component part is replaced until the component part fails next time;
   an importance level judgement unit, implemented by the hardware, configured to judge an importance level of an inspection on the component part based on the influence index; and
   an inspection time determination unit, implemented by the hardware, configured to determine an inspection time of the component part according to the importance level,
   wherein every time a failure occurs in the component part:
      the index acquisition unit acquires the influence index,
      the inspection time determination unit updates the inspection time of the component part, and
      the importance level judgement unit updates the importance level of an inspection on the component part.

2. The equipment inspection system according to claim 1, further comprising a candidate calculation unit, implemented by the hardware, configured to calculate an inspection time candidate based on a time predicted that the component part fails, wherein
   when the importance level is lower than or equal to a predetermined rank and when a predetermined regular replacement time of the component part comes before the inspection time candidate, the inspection time determination unit excludes the component part from an inspection item.

3. A method of inspecting an equipment comprising:
   acquiring at least one influence index indicating a degree of an influence exerted by a failure in a component part of an equipment on an operation of the equipment, wherein the influence index includes a first index related to a time required for a recovery of the equipment including the component part when the component part fails and a second index related to an operating time of the equipment including the component part from when the component part is replaced until the component part fails next time;
   judging an importance level of an inspection on the component part based on the influence index; and
   determining an inspection time of the component part according to the importance level,
   wherein every time a failure occurs in the component part, the method further:
      acquires the influence index,
      updates the inspection time of the component part, and
      updates the importance level of an inspection on the component part.

4. A non-transitory computer readable medium storing a program that causes a computer to execute:
   acquiring at least one influence index indicating a degree of an influence exerted by a failure in a component part of an equipment on an operation of the equipment, wherein the influence index includes a first index related to a time required for a recovery of the equipment including the component part when the component part fails and a second index related to an operating time of the equipment including the component part from when the component part is replaced until the component part fails next time;
   judging an importance level of an inspection on the component part based on the influence index; and determining an inspection time of the component part according to the importance level,
wherein every time a failure occurs in the component part, the computer further:
acquires the influence index,
updates the inspection time of the component part, and
updates the importance level of an inspection on the component part.

\* \* \* \* \*